UNITED STATES PATENT OFFICE.

ADOLPH WOOLNER, JR., AND CHRISTIAN ANDERSEN, OF PEORIA, ILLINOIS.

PROCESS OF TREATING DISTILLERY-SLOP.

SPECIFICATION forming part of Letters Patent No. 653,645, dated July 10, 1900.

Application filed July 27, 1899. Serial No. 725,243. (No specimens.)

*To all whom it may concern:*

Be it known that we, ADOLPH WOOLNER, Jr., and CHRISTIAN ANDERSEN, citizens of the United States, residing at Peoria, in the county of Peoria and State of Illinois, have invented certain new and useful Improvements in the Manufacture of Feed; and we do hereby declare that the following is a full, clear, and exact description of the invention, which will enable others skilled in the art to which it appertains to make and use the same.

This invention relates to a process of preparing dry feed from distillery-slop.

The object of our invention is to increase the yield of dry feed from the slop of a given amount of grain. Furthermore, the object is to save the best and richest portions, which have heretofore been discarded as worthless. As a matter of fact the thinner portions of the slop contain more nutritive properties and make better feed than the dry feed ordinarily manufactured from slop. Besides saving the solids from these thinner portions we reduce said thinner portions to a syrup by evaporation and add such syrup to the thicker portions which have been settled and then treat the combined product, which is a very valuable dry feed for live stock.

The method of accomplishing the above results may vary considerably, and we do not bind ourselves to any particular manner of reaching these results, but in practice we use the following and find it to be very effective. The slop taken from beer-stills is run into tubs and allowed to settle. The thin portions are drawn off and run into a mixing-tub. The thicker settled portions, from the top of which the thinner portions have just been drawn, are run into filter-presses for the purpose of extracting the thin portions and saving the thicker material. The extract then derived is run to the said mixing-tub and combined with the liquid drawn from the said settling-tubs. From the mixing-tub the fluid is conveyed to the vacuum-pans, where it is evaporated until it reaches the consistency of syrup and when reduced to that state may be mixed with chaff or other similar material or with some of the thick portions of the slop in one of the tubs used for settling purposes, and it may again be run through the filtering-presses. The thick portions thus saved and combined with the dry feed in the presses is passed through suitable driers and is ready for shipment. In mixing the syrup from the vacuum-pans with chaff the material need not be again run through the filtering-presses, because sufficient chaff will take up the most of the moisture and the balance of the moisture will be driven off by the driers, into which the product may be put and rendered ready for shipment.

We allow nothing to escape from the slop except moisture by evaporation, and hence there is no loss of material. As already set out, two methods are open for use: first, the reduction of the thin slop to a syrup and mixing that with chaff or other suitable material or carrying such syrup to the settled portion of the tub and again passing it to the filter-presses. In either case, however, the material from which the filtrate is derived or the mixed syrup and chaff product are carried to suitable driers, as before set forth.

We wish to make it understood that our process of evaporating slop in vacuum is new as applied to the treatment of distillery refuse for obtaining dry feed. To reduce in any other manner would be fatal to the feed being prepared. Applying direct heat in open air would scorch the feed and render it unfit for use. It is well known that evaporation is much quicker in vacuum than in air and that less heat is required by such a method. Consequently the proper reduction is acquired without scorching the material.

Obviously other slops holding grains may be treated by our process as well as slop derived from distillery products. In so far as we are aware no process has been employed whereby the thin portions of slop have been reduced to a useful feed product.

We claim—

The process of manufacturing feed from distillery-slop, which consists in settling the slop, drawing off the thin portion, subjecting the settled portion to pressure to extract the thin liquid, combining the latter with the said drawn-off portion and evaporating the combined portions in a vacuum, mixing the residue with other settled portions then subjecting the same to pressure and drying the material from which the liquid is extracted.

In testimony whereof we affix our signatures in presence of two witnesses.

ADOLPH WOOLNER, JR.
CHRISTIAN ANDERSEN.

Witnesses:
JOHN SHANNAHAN, Jr.,
I. M. COHN.